Patented June 16, 1936

2,044,007

UNITED STATES PATENT OFFICE 2,044,007

RESINOUS PRODUCTS FROM CHLORINATED OXIDIZED FATTY OILS

James Scott Long, Coopersburg, and George Loyal Ball, Jr., Bethlehem, Pa.; said Ball assignor of one-third to Archer-Daniels-Midland Company, a corporation of Delaware, and one-sixth to Lehigh University, a corporation of Pennsylvania No Drawing. Application July 17, 1931, Serial No. 551,580. Renewed August 28, 1935

10 Claims. (Cl. 260—2)

This invention relates to a novel method of treating fatty oils to prepare from them certain condensation products or compositions of matter of a resinous or plastic nature which will be useful alone or with other ingredients in various protective coatings such as paint, varnish, enamel, lacquer, linoleum, tile, oil cloth, printing ink, brake linings, core oils, patent leather, sand paper, window shades, slickers etc.

The method of treating the oils involves oxidation, chlorination and resinification, preferably in the order given and with or without the presence of catalysts in the various stages. The oils referred to in this invention are the drying oils, linseed, perilla, China-wood, fish, soy bean and other less prominent drying oils and also the free fatty acids derived from them and also esters of these with glycol, mannitol, pentaerythritol, methanol and other alcohols besides glycerine with which they are usually found combined in the natural oils mentioned. Also mixtures of any or all of these in various proportions.

The non-drying oils such as cottonseed oil, corn oil, etc. are not particularly suitable for this purpose.

We will describe first certain general features of the steps involved in the process for the preparation of these novel and useful products.

As a preliminary to chlorination, the oil is oxidized preferably by blowing air, oxygen, ozone or mixtures of these through it, or a solution of it in a solvent or dispersing agent such as $CCl_4$ etc. at moderate temperatures e. g. 10° C. to 100° C. Temperatures of 30 to 60° C. are preferred. The oil oxidizes more rapidly if the temperature is higher, e. g. 90° C. but the oxidized oil obtained at the higher temperatures is not as reactive in the later steps as oil oxidized to a comparable extent at lower temperatures. Also lighter colored oils are obtained at the lower temperatures.

It is thought that at higher temperatures more or different molecular rearrangements take place with or without loss of water or other volatile products and that because of this the resultant oxidized oil is less reactive in the later stages of reaction.

Oil oxidized at the higher temperatures, even if it took up as much chlorine as oil oxidized at lower temperatures was not as reactive, i. e. did not condense as readily or completely and did not make resins as hard or desirable as the oil oxidized at the lower temperatures.

After an initial induction period during which oxidation is slow the oil thickens from day to day as oxidation proceeds. In some cases there was little noticeable change in the body or viscosity of the oil for 4 to 6 days (96 to 144 hours) although the color became noticeably lighter and tests showed that oxygen was uniting with the oil. After this period of slow change the oil thickened steadily and at the end of 250 hours was light colored, very thick and viscous and in some cases would set to a solid gel. The very thick, highly oxidized products made hard, tough resins but we find that the oil at various stages of oxidation yielded valuable products when subjected to the later stages in the treatment. For some purposes it is desirable to oxidize the oil to a very thick product before chlorinating. For other products it is desirable to chlorinate oil that has been oxidized to a much less extent.

Sulphur which is in many respects similar to oxygen and is a member of the same family of elements, also unites with the fatty oils. Since sulphur is a solid it is simply stirred into the oil with the aid of heat. Viscous oils result which are in some respects similar to the oils treated with oxygen. They have bad odors and are darker in color than the oils treated with oxygen but these oils which we will call sulphurized oils can also be converted into similar novel and valuable resinous or plastic products when subjected to the later states in this treatment. It is therefore understood that what applies to the oxidized fatty oils applies also to sulphurized oils as well. Accordingly, it is to be understood that when we refer to "oxidized oils" or "oxidation" we intend these terms to be broad enough to include the treatment with sulphur.

The time required for the oxidation, and particularly the initial induction period can be appreciably shortened by the presence of a small percentage of metal as oleate, linoleate, resinate, naphthenate or other dispersible compound. Thus lead resinate equivalent to 0.1% Pb materially shortens the time required to reach a given body or degree of oxidation. Other accelerators or catalysts such as benzoyl peroxide may be used.

The oxidized oil is then treated with chlorine. The oxidized oil is thick and viscous and the addition of chlorine increases the viscosity. It is therefore advantageous to dissolve or disperse the oxidized oil in a solvent or medium and chlorinate it in this solvent or medium. Carbon tetrachloride is a very suitable medium, since it is not in itself attacked by chlorine, is a good solvent for the oxidized oil, can be driven off later at least in part by application of heat, is non-inflammable and relatively inexpensive. We accordingly prefer to carry out the chlorination in carbon tetrachloride (CCl4) solution, but we do not wish to limit ourselves to the use of this solvent.

The oxidized oil is dissolved in 1 to 5 times its volume of CCl4. It is preferably cooled to −10° C. This can be done by means of cold brine or other refrigerating medium. Chlorine (which ordinarily will be used in the gaseous phase) is added as long as it is readily taken up at this temperature. More chlorine can be added to the oil if desired by removing the oil from the brine and allowing it to warm up to room temperatures of say 15 to 25° C. or by the use of a little heating, and passing chlorine into it while it is coming up to these temperatures and for a little while longer. In place of chlorine other halogens may be used.

This invention enables one to make not simply one product but a series of resinous and plastic materials which vary considerably in hardness, gloss, solubility and other properties. One way to get the desired variation in properties of the products is to vary the extents of oxidation and chlorination or the ratio of them. For this reason it may be desirable to limit the extent of chlorination. In other cases it is desirable to achieve the maximum possible degree of chlorination.

It is felt that the reactions occurring during the oxidation and chlorination are indicated by the following outline which portrays the action at one double bond (ethylene linkage). This action may take place at some or all of the double bonds depending on the extents of oxidation and chlorination.

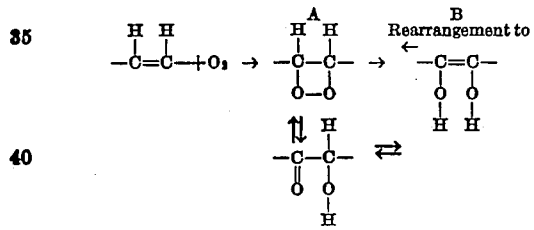

It is felt that if we take the arrangement shown as B, the addition of chlorine produces compounds such as

Chlorine can add to form A in similar ways.

In the third step of the process,—the condensation or resinification step—which will now be discussed, the chlorinated oxidized oil is heated. In many cases the chlorination is carried out in the presence of a solvent, and if it is desired to get the resinous or plastic material, substantially free from this solvent as such, the heating will have two functions 1. Removal of the solvent.
2. Promotion of the third step of the process in which the chlorinated oxidized oils undergo reaction to form resinous or plastice products. HCl gas is evolved. The resinous or plastic products obtained therefore contain much less chlorine than was added to the oil and might conceivably contain none at all if the conditions were just right so that for each chlorine atom that had been added there was one hydrogen atom available in this form to unite with it in the resinification process.

As the solvent, e. g. CCl4, and HCl gas come off, the mass remaining in the vessel thickens and finally becomes solid. By continuing the heating for various lengths of time the extent to which the resinification occurs can be controlled and can be varied to give a series of products of differing degrees of hardness.

Experimental data lead us to believe that where CCl4 is used as the solvent, a part of this material actually enters into the reaction, perhaps according to the following equations:

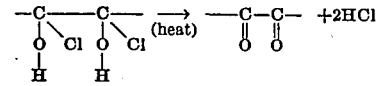

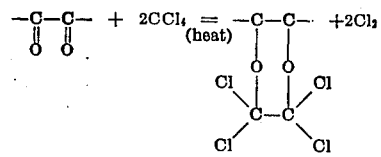

This is borne out by the fact that our product shows combined chlorine and that all the CCl4 is not recovered. Further, the products obtained using solvents which do not contain chlorine are substantially different in many characteristics. Other solvents containing chlorine, such as ethylene dichloride, may give somewhat equivalent results to carbon tetrachloride.

In general, unless the heating is carried too far, or unless the temperature is allowed to become too high, the resinous or plastic materials that result from the process, are light in color and are soluble in lacquer solvents, oxidized linseed oil, China-wood oil, in raw or refined linseed oil if some pine oil is first added, in turpentine, xylene and other solvents or solvent-diluent mixtures. In order to dissolve the resinous or plastic material in somewhat oxidized linseed oil, or in China-wood oil, it is necessary to heat the oil and resin together for a short time at relatively low temperatures e. g. 200° C. whereas many varnishes are made at 290° C.

When a solution of the resinous or plastic material in a volatile solvent is sprayed, brushed or flowed on to a wood or metal surface, it sets largely by evaporation of the solvent to a tough, elastic, glossy film which renders it a useful ingredient in various types of protective coatings as previously mentioned. By combining the resinous or plastic material with drying oils either raw, refined or processed, varnishes result which set or dry rapidly, largely by evaporation of the solvent, but in which subsequent further changes due to oxidation and related and consequent effects play a larger role due to the drying oils present and depending on the proportions of drying oil to the resinous or plastic material.

We will give several examples to show how the resinous or plastic materials referred to are made.

*Specific Example I*

An alkali refined linseed varnish oil is placed in the blowing apparatus and blown continuously for 240 hours at a temperature between 38–40° C. For the first 125 hours there is apparently no visible reaction but at that time the oil bleaches and begins to become viscous. At the end of the blowing the oil has a color between tube 2 and 3 on the Gardner standard varnish color set and a viscosity about twice that of tube T in the Gardner-Holdt buble viscosity outfit.

This oil is then mixed with five times its weight of carbon tetrachloride and heated slightly to obtain uniform solution and then allowed to cool again to room temperature.

The diluted oil is then placed in a flask enclosed in a salt and ice bath and chlorine is passed in until the oil apparently absorbs no more as is indicated by a gas bubble bottle of KOH inserted in the system. While the chlorine is being passed into the oil, the temperature of the bath is allowed to rise so that at the end of the chlorination the bath is at room temperature or slightly above it.

This chlorinated product is then heated to between 75°-95° C. to remove the carbon tetrachloride and also cause the resinification to take place. A plastic resinous product about the color of the original varnish oil results.

This product can be dissolved in ethyl acetate and acetone and applied to a surface. The resulting film is very elastic and has very good adhesion to many surfaces.

Furthermore, this product can be dissolved in ethyl acetate and mixed with a solution of nitrocellulose in the proportion of say 1 part of the resin to 2 parts of the nitrocellulose and a coating results which has a very high lustre, is very elastic and has good adhesion to many surfaces.

*Specific Example II*

A similar varnish oil containing 0.2% Pb as lead resinate is blown at 20°-25° C. for 100 hours at which time the viscosity is similar to the oil previously described after 240 hours blowing at 38° to 40° C.

This product is then chlorinated in a similar manner as described in Example I and the resulting product is a plastic resinous material.

*Specific Example III*

A similar oil was blown at 80° C. for 80 hours. The resulting oil was between 3—4 in color on the Gardner varnish standard color outfit and about twice the viscosity of tube T in the Gardner-Holdt bubble viscosity standards. The oil was diluted and chlorinated as described in Example I. The resulting product was a plastic viscous material.

*Specific Example IV*

Varnish oil was blown for 200 hours at 40° C. The oil was similar in color to that described in Example I but the viscosity was very much less—just about or slightly slower than tube T in the Gardner-Holdt bubble set. This oil was diluted with CCl4 in the ratio of 3 parts carbon tetrachloride to 1 part of oil and chlorinated at room temperature. The chlorinated oil was then heated to remove the free CCl4 and a plastic resinous product resulted.

As a separate feature of the process we have found that chlorinated drying oils will react with metallic salts, particularly sodium salts and with other compounds, e. g., resorcinol, which remove the chlorine and substitute a radical (usually an acid radical) in its place. Thus when chlorinated linseed oil was heated with (1) sodium phenolate (2) sodium acetate (3) sodium ortho phenyl phenate and other salts, reactions took place and we think that NaCl is formed and that the acid radical of the salt is substituted for Cl in the oil molecule. The three salts mentioned are simply examples. By heating various chlorinated oils with these salts or other compounds, various acid radicals of the salts, resorcinol etc. have been substituted for part or perhaps all of the chlorine thus producing oils with side chains, and by varying these radicals quite different products are obtained.

This latter process may also be used to remove chlorine from the resinous or plastic materials made by condensation of chlorinated oxidized fatty oils and thus offers opportunity to vary the characteristics of these products over a wider range than if we are limited strictly to the third or resinification step to remove the chlorine as HCl.

This feature of removing chlorine from the oil, and substituting a radical in its place, may therefore be used as a fourth step in the process, which step may be used to remove chlorine not eliminated in the resinification step.

Under certain conditions it may be advisable to change the order of the steps given. Thus a variation of the process consists in removing part of the chlorine by reaction with a compound such as sodium phenolate before carrying out the third step which we have designated as the resinification step in the process. We, however, prefer the order given.

Also another variation consists in giving the drying oil a preliminary treatment in some way to shorten the time required for oxidation or especially to shorten or eliminate the induction period. This may be done by (1) partial chlorination before oxidation, i. e., carrying out a part of the reaction that is designated as step 2 before doing step 1. (2) addition of metallic compounds or other catalysts or accelerators to the drying oil, at the start or during the oxidation. (3) A previous slight heat treatment of the drying oil. (4) Complete or partial destruction of anti-oxidants present in the original drying oil or complete or partial removal of them from the oil.

What we claim is:

1. The process of preparing fatty oil reaction products which comprises oxidizing a fatty oil, chlorinating it and thereafter heating the oil until chlorine is driven off.

2. A process of preparing linseed oil reaction products which comprises causing linseed oil to combine with a substance selected from the group consisting of sulphur and oxygen and also with a halogen and heating the resulting product until halogen material is driven off and the resulting product is thickened.

3. A new composition of matter comprising the reaction products resulting from halogenating oxidized fatty oil in the presence of a chlorine containing solvent, which products have been heated to drive off halogen and free solvent.

4. A new composition of matter comprising the reaction products resulting from halogenating oxidized fatty oil in the presence of carbon tetrachloride, which products have been heated to drive off halogen and free solvent.

5. The process of preparing resinous bodies which comprises oxidizing linseed oil, chlorinating in the presence of carbon tetrachloride and thereafter heating the resulting product until chlorine and free carbon tetrachloride are driven off and the oil caused to resinify.

6. A body of a resinous nature comprising substantial proportions of halogenated oxidized fatty oil from which a substantial amount of the halogen has been removed.

7. A body of a resinous nature consisting of the reaction products produced by chlorinating an oxidized fatty oil in the presence of carbon tetrachloride and which products are thereafter heated to drive off carbon tetrachloride and chlorine.

8. Process of preparing fatty oil reaction products which comprises oxidizing a fatty oil, halogenating it and thereafter heating the oil until halogen is driven off.

9. A process as specified in claim 1 which includes the further step of adding to the chlorinated oxidized fatty oil prior to the said heating, a substance composed of a radical adapted to combine with such oil, combined with an element adapted to combine with chlorine, whereby when the chlorinated oxidized fatty oil and said substance are heated, chlorine will be driven off in the form of a binary compound thereof.

10. A process as specified in claim 1 which includes the further step of adding carbon tetrachloride to the fatty oil prior to chlorinating it whereby when the said heating step is carried on carbon tetrachloride and chlorine will be driven off.

JAMES SCOTT LONG.
GEORGE LOYAL BALL, Jr.